Aug. 4, 1964 D. G. SHEARER 3,143,033
METHOD OF MAKING MOTION PICTURES USING ANAMORPHIC LENSES
Filed Jan. 10, 1955
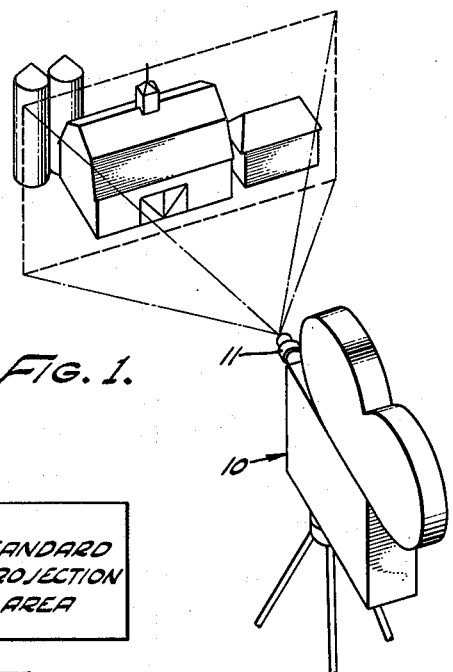
FIG. 1.
FIG. 4.
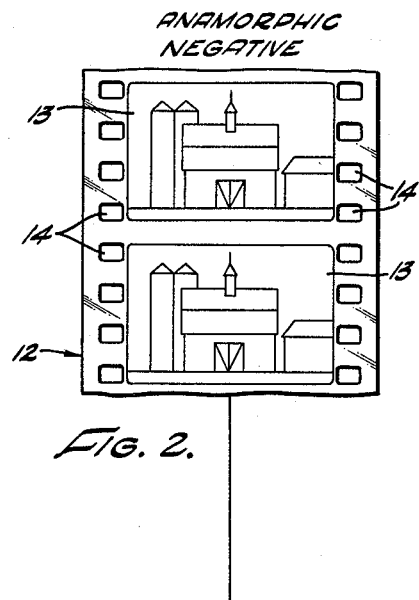
FIG. 2.
FIG. 5.
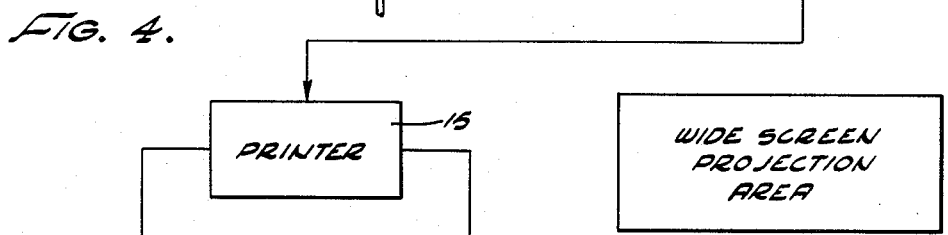
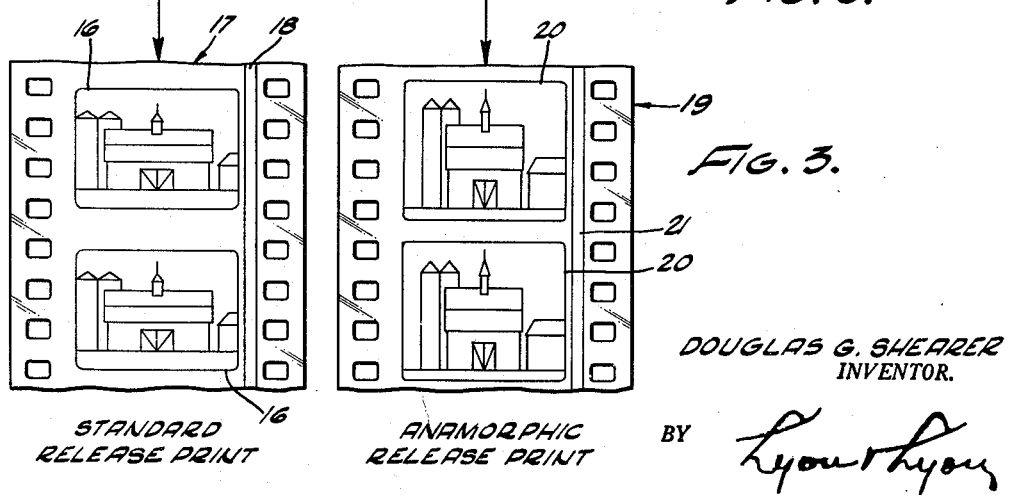
FIG. 3.
DOUGLAS G. SHEARER
INVENTOR.
BY Lyon & Lyon
ATTORNEYS United States Patent Office 3,143,033
Patented Aug. 4, 1964

3,143,033
METHOD OF MAKING MOTION PICTURES USING ANAMORPHIC LENSES
Douglas G. Shearer, Los Angeles, Calif., assignor to Metro-Goldwyn-Mayer Inc., a corporation of Delaware
Filed Jan. 10, 1955, Ser. No. 480,848
5 Claims. (Cl. 88—24)

This invention relates to the art of motion picture photography. It is concerned with the problem of producing release prints for projection upon either of two types of screen. The so-called "standard" screens have a width only slightly greater than the height, and the so-called "wide screens" have a width substantially greater than their height. For example, standard screens may have a width-to-height ratio of approximately 4 to 3, while for wide screens the corresponding ratio may be 2 to 1. Many theaters are equipped with wide screens but many are not, and, therefore, it is desirable to furnish release prints of the same photoplay for projection on either type of screen.

It is not practicable to use the same release print for both types of screen because the difference in shape would require excessive vertical or horizontal cropping of the picture area. For standard screens it is preferred to use standard 35 mm. release prints which have a picture area of approximately the same shape as the screen. For wide screen projection, however, it is preferred to use release prints having frames of normal width but which carry anamorphosed images, that is, images which are of normal height but compressed laterally. These laterally distorted images are projected on the wide screen by means of an anamorphic lens on the projector, with the result that the projected picture has a width/height ratio greater than that of the frame size on the film, and the projected picture on the wide screen no longer exhibits lateral compression.

Release prints for wide screen projection have heretofore been made (by contact printing or other process) from a negative having fully anamorphosed images. That is, the degree of lateral compression of the images has been the same on both negative and positive, and the full desired extent of anamorphosis has been contained in the negative. This has the disadvantage, however, of requiring that each scene be photographed by two cameras; one camera produces a conventional 35 mm. negative, and another camera uses an anamorphic lens to produce the negative with laterally compressed images. The fully anamorphic negative is inadequate to produce standard release prints. Another method is to accomplish the entire anamorphic step in the printer—that is, to use an anamorphic lens system in the printer to produce an anamorphic release print directly from a conventional negative. Both of those methods have the disadvantage that the required degree of lateral compression is so great when done in a single step that the anamorphic lens system for the camera, or for the printer, must sacrifice definition and produces residual rectilinear distortions.

My present invention eliminates these disadvantages. I employ an anamorphic lens on the camera but the degree of lateral compression is only about one-half of that previously required. As a result I achieve greater freedom from uncorrectable optical distortions which characterize high degree anamorphic lenses. Furthermore, the negative so produced with its moderate lateral compression of the images can efficiently be employed to make either standard prints without lateral compression of the images, or wide screen prints having maximum lateral compression of the images. If standard prints are required, an anamorphic lens is used in making positive prints to remove all lateral compression, so that the positive print has uncompressed images. If wide screen prints are required, an anamorphic lens in the printer is used but is caused to increase the degree of lateral compression so that the images on the positive print have the desired final lateral compression.

Further purposes, objects, uses and advantages of my invention will become apparent from the following detailed description of a preferred embodiment thereof.

In the drawings:
FIGURE 1 is a perspective view in diagrammatic form showing a motion picture camera equipped with an anamorphic lens and showing a scene to be photographed.
FIGURE 2 shows a section of negative film after development, the images exhibiting moderate lateral compression.
FIGURE 3 shows a printer in diagrammatic form and also shows sections of positive prints for use in projection against "standard screens" and "wide screens."
FIGURE 4 shows a projection screen of "standard" proportions.
FIGURE 5 shows a projection screen of the "wide screen" type in which the width is substantially greater than the height.

Referring to the drawings:
The motion picture camera generally designated 10 is equipped with an anamorphic lens 11. This lens 11 has the property of reducing photographic images unequally along axes substantially at right angles to each other. The lens 11 is mounted on the camera 10 in a manner so that the lateral dimensions of the scene are moderately compressed but the vertical dimensions are substantially unaffected. After developing, the negative film strip 12 has the appearance shown in FIGURE 2. It will be noted that the images 13 are compressed laterally with respect to the height. Substantially the full width of the film strip between the sprocket holes 14 is occupied by the images 13, in order that the greatest amount of information may be recorded on the negative film strip 12.

In accordance with my invention the negative film strip is not contact printed to produce a positive print, but instead is printed through an optical printer 15 which employs an anamorphic lens, not shown, but which is similar to the camera lens 11. Both the negative and positive film strips may comprise standard 35 mm. film. However, the picture area of each frame 16 on the positive prints is smaller than the images 13 on the negative film strip 12. As pointed out in the Ceccarini Patent No. 1,938,808, this is not undesirable because the positive print normally has smaller grain size than the negative film strip; the coarse grain size required for photographic speed is used for the negative film but is not required for the positive film.

When it is desired to produce a standard release print on which the images are free from lateral distortion, the anamorphic lens in the printer is positioned so that the lateral compression of the negative images is eliminated on the positive print. The individual frames 16 on the standard release print 17 are therefore a faithful reproduction of the center part of the scene photographed by the camera 10. One or more sound tracks 18 may be placed on the positive print 17 and these may be either photographic or magnetic, as desired.

When it is desired to produce an anamorphic release print 19, the anamorphic lens in the printer 15 is positioned to increase the extent of lateral compression so that the maximum lateral compression is achieved for wide screen projection. The images on the frames 20 on the anamorphic release print 19 therefore have a greater lateral compression than the degree of compression on the negative film strip 12. One or more sound tracks 21 may be placed on the positive print 19 and these may be either photographic or magnetic as desired. An outstanding advantage of my invention is that the negative film strip 12 may be used to produce either a standard release print 17 or the anamorphic release print 19. Furthermore, superior quality is achieved in the anamorphic release print 19 because the two anamorphic steps, in the camera 10 and in the printer 15, are both of relatively low ratio and hence easy to achieve with good quality.

While the anamorphic lens 11 in the camera 10 must have the same lateral compression characteristics as the anamorphic lens in the printer 15 when making standard positive prints 16, the two lenses need not be identical when making anamorphic release prints 19. While I prefer to use identical lenses in the latter case, this is not essential, and the degree of lateral compression produced by the two lenses need not be equal. My invention may be used with either black and white or color film. Any suitable color process such as monopak, screen, lenticular, imbibition, or wash-off relief may be employed. Furthermore, the release prints need not be of the same nominal width as the negatives. For example, 16 mm. prints may be made from 35 mm. negatives.

Having fully described my invention, it is to be understood that I do not wish to be limited to the details herein set forth but my invention is of the full scope of the appended claims.

I claim:

1. The method of making a motion picture positive print, comprising the steps of: exposing negative film in a motion picture camera through an anamorphic lens system to produce latent images which are laterally compressed, developing the negative film, printing the negative film through an anamorphic lens system to produce latent images of greater lateral compression upon a positive print, and developing the positive print to form the images thereon, a substantial proportion of the total lateral compression achieved in the print being supplied by both the exposing step and the printing step, whereby both lens systems may have low ratios of lateral compression and thereby minimize residual rectilinear distortions in the print.

2. The method of making a motion picture positive print, comprising the steps of: exposing negative film in a motion picture camera through an anamorphic lens system to produce latent images which are compressed laterally to a certain degree, developing the negative film to form the laterally compressed images on the film, printing the negative film through a similar anamorphic lens system to produce latent images having twice the degree of lateral compression upon a positive print, and developing the positive print to form the images thereon, whereby both lens systems may have low ratios of lateral compression and thereby minimize residual rectilinear distortions in the print.

3. The method of making a motion picture positive print, comprising: making a motion picture negative film strip including the step of exposing negative film in a motion picture camera by means of an anamorphic lens system to form laterally compressed images on the negative film strip, making a positive print therefrom including the step of printing the negative film strip through an anamorphic lens system to form images on the positive print having a greater degree of lateral compression, a substantial proportion of the total lateral compression achieved in the print being supplied by both the exposing step and the printing step, whereby both lens systems may have low ratios of lateral compression and thereby minimize residual rectilinear distortions in the print.

4. The method of producing photographically anamorphous motion picture records of scenes comprising the steps of photographing the scene by compression in only one direction of the image of the scene so as to produce a primary record having a degree of anamorphism, and printing the primary record with an additional degree of anamorphism by compression in the same direction as said one direction of the image of the scene upon a secondary record, the degree of anamorphism in the photographing and printing steps respectively being less than the total degree of anamorphism and the total degree of anamorphism in the secondary record being the product of anamorphism separately introduced in the two stages, said secondary record comprising substantially the whole of said primary record.

5. The method of producing photographically anamorphous motion picture records of scenes comprising the steps of photographing the scene by compression in only one direction of the image of the scene so as to produce a primary record having a degree of anamorphism, and printing the primary record with an additional degree of anamorphism by compression in the same direction as said one direction of the image of the scene upon a secondary record, the degree of anamorphism in the photographing and printing steps respectively being less than the total degree of anamorphism and the total degree of anamorphism in the secondary record being the product of anamorphism separately introduced in the two stages, said secondary record comprising substantially the whole of said primary record, and wherein the degree of anamorphism in the two stages is such that the primary record has a standard aspect ratio and the scene and secondary record respectively have greater and lesser aspect ratios.

References Cited in the file of this patent

UNITED STATES PATENTS

| | | |
|---|---|---|
| 1,372,936 | Clark | Mar. 29, 1921 |
| 1,829,633 | Chretien | Oct. 27, 1931 |
| 1,829,634 | Chretien | Oct. 27, 1931 |
| 1,894,264 | Chretien | Jan. 17, 1933 |
| 1,894,265 | Chretien | Jan. 17, 1933 |
| 1,938,808 | Ceccarini | Dec. 12, 1933 |
| 2,037,017 | Gardner | Apr. 14, 1936 |

FOREIGN PATENTS

| | | |
|---|---|---|
| 617,337 | Great Britain | Feb. 4, 1949 |